United States Patent [19]
Rubin

[11] Patent Number: 5,183,540
[45] Date of Patent: Feb. 2, 1993

[54] METHOD FOR RECOVERING SOLVENTS THROUGH THE USE OF AN EXTENDER

[76] Inventor: Isadore E. Rubin, 247 Tillou Rd., South Orange, N.J. 07079

[21] Appl. No.: 584,280

[22] Filed: Sep. 18, 1990

[51] Int. Cl.$^5$ .................. B01D 3/10; B01D 15/00
[52] U.S. Cl. .......................... 203/41; 34/20; 34/33; 106/485; 159/25.1; 159/47.1; 159/DIG. 16; 202/175; 202/205; 202/265; 203/47; 203/91; 203/DIG. 25
[58] Field of Search ........... 203/41, 100, 91, DIG. 25, 203/47; 202/265, 175, 205; 159/25.1, 47.1, DIG. 16; 34/20, 33; 106/485

[56] References Cited

U.S. PATENT DOCUMENTS

| | | | |
|---|---|---|---|
| 3,853,574 | 12/1974 | Ferrigno | 106/485 |
| 3,894,882 | 7/1975 | Takewell et al. | 106/485 |
| 3,956,060 | 5/1976 | Scoggin | 159/48.1 |
| 3,986,969 | 10/1976 | Telkes | 252/70 |
| 4,173,492 | 11/1979 | Pollard | 106/452 |
| 4,532,024 | 7/1985 | Haschke et al. | 203/68 |
| 4,532,272 | 7/1985 | Wilt et al. | 523/330 |
| 4,619,705 | 10/1986 | Dixon et al. | 106/487 |
| 4,659,477 | 4/1987 | Macedo et al. | 210/679 |
| 4,790,911 | 12/1988 | Parkinson | 202/205 |
| 4,929,340 | 5/1990 | Pollastrini et al. | 208/207 |

FOREIGN PATENT DOCUMENTS

| 0561125 | 7/1958 | Canada | 203/41 |
|---|---|---|---|
| 0005205 | 1/1985 | Japan | 203/41 |

*Primary Examiner*—Virginia Manoharan
*Attorney, Agent, or Firm*—Louis Weinstein

[57] ABSTRACT

Method for the recovery of solvent from a solvent-based wash liquid containing non-hazardous waste resulting from an equipment cleaning operation. The wash solution typically averaging approximately 90 percent solvent and 10 percent resin, pigments and other dissolved or suspended solids is continuously tumbled in a tumbler/evaporator vessel together with a highly porous, adsorbent extender in granulated form, while maintaining temperatures sufficient to evaporate the solvent and prevent the solid matter from sticking together after processing. The extender is a substantially inert, material and may be selected from diatomaceous earth, powdered calcium silicate, powdered glass (100 mesh), oak sawdust (100 mesh), cedar sawdust (100 mesh), bentonite, charcoal (100 mesh) and ground corn cobs. The amount of extender introduced into the vessel is of the order of 5 to 20 percent by weight of the wash solution. The system may employ jacketed ribbon, double cone or rotating helix blenders. A blender of the type which tumbles and moves the extender and wash solution from an input end toward the output end thereof at a sufficiently low and steady feed rate may be utilized to provide a continuous process as opposed to a batch process, the residence time being sufficient to dry the solid residue.

16 Claims, 3 Drawing Sheets

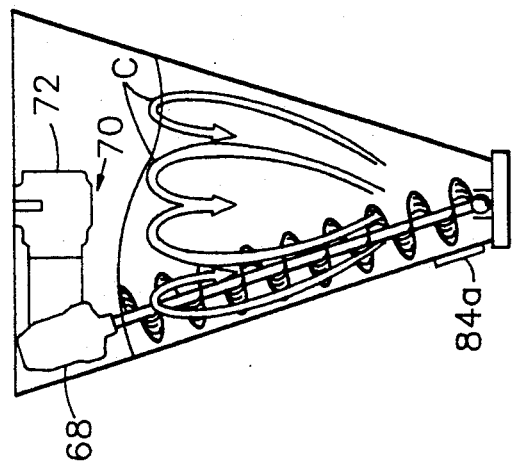
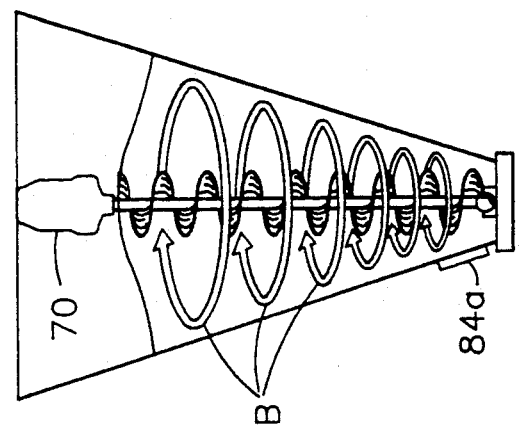
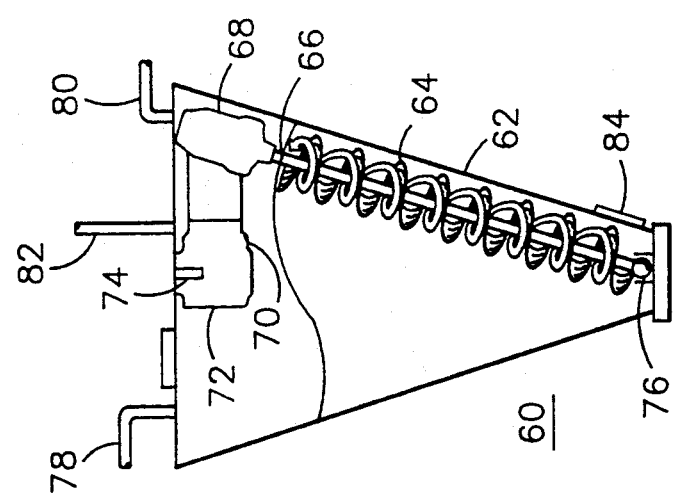

METHOD FOR RECOVERING SOLVENTS THROUGH THE USE OF AN EXTENDER

FIELD OF THE INVENTION

The present invention relates to a method and apparatus for the separation of residue from a solvent-based wash liquid and more particularly to a method and apparatus for separation and recovery of the solvent from the residue wherein the residue is reduced to non-hazardous waste of small volume and which is easy to dispose of.

BACKGROUND OF THE INVENTION

The present invention relates to recovery of solvent from solvent-based wash liquids such as wash liquids encountered in paint, ink, resins, and similar industries for cleaning of equipment, the invention being comprised of a method and apparatus for reducing most residues (i.e. the non-solvent portion of the wash liquid) to non-hazardous waste matter of small volume which is easy to handle and to dispose of as ordinary garbage and further eliminating the need for any additional treatment.

PRESENT PRACTICES

Equipment Washing

In the paint, resin and allied industries it is important to carefully wash the equipment after each use. For example, equipment which has just been used to produce red paint and which is now desired to be used to produce a "pure" white paint, must be thoroughly washed and cleaned since even minute amounts of red residue will cause severe problems or even render the production of white paint impossible.

Typically, after such equipment is cleaned once or twice with a wash liquid, usually of the solvent-based type, the dirty wash liquid is withdrawn and the equipment is then rinsed with a clean solvent as a final flush.

Although the above example sets forth a procedure employed in cleaning equipment for making paint, it should be understood that similar conditions occur in ink, resin, fine chemical and other production systems where contamination from previous batches or production runs or subsequent runs of different materials may cause a great variety of problems.

The wash solution drained from the equipment after washing in the paint application set forth hereinabove is generally a quite dilute solution averaging approximately 90 percent solvent and the remaining approximately 10 percent being resin, pigments and other dissolved solids. The 10 percent solids is an average, based on many years of observations and testing. Occasionally, higher solids concentrations may be present (of the order of 15 to 18 percent) and sometimes lower concentrations (of the order of 5 to 8 percent) are encountered. Nevertheless, the range of solids concentration does not reduce the effectiveness of the method and process of the present invention.

SOLVENT EVAPORATION TECHNIQUES

A number of devices are available for the recovery of a solvent in a solvent-based wash liquid. Recovery equipment of this type generally falls into two categories:

(a) Simple Heating Units

Devices falling into this category frequently include agitation means for agitating the wash liquid during heating to increase efficiency. However, these systems are limited in that they are not able to evaporate all of the solvent. Efforts to attempt complete evaporation lead to extremely high viscosities or even complete solidification of the residue. Quite often, the residue is not capable of being poured or discharged out of the evaporating vessel and often the equipment may be damaged severely when attempts to evaporate the solvent closely approach complete evaporation. The resins encountered in such equipment are normally "designed" to form hard solids at room temperature when they are "dry". Generally, evaporation can safely proceed to 50 percent solid maximum under normal circumstances. A numerical illustration of this result is set forth hereinbelow.

1. Assume that 100 pounds of wash liquid is to be treated and that the contents thereof is 10 percent solids (i.e. 90 pounds solvent, 10 pounds solid).

2. Assume evaporation from a still to 50 percent solids and 50 percent solvent. At this point we would still have 10 pounds of solids (as listed in Paragraph 1) above. There would be 10 pounds of solvent present in the still yielding a total of 20 pounds of residue; there being 80 pounds of evaporated solvent which we will assume is condensed for reuse.

3. The result of the above operation is still 20 pounds of residue which is a hazardous waste according to the standards of the Environmental Protection Agency (EPA). This 20 pounds of residue is difficult and expensive to dispose of. At present the cost is in the order of $500-$600 per 55 gallon drum of hazardous waste. If drums containing hazardous wastes are placed in a landfill, the originator may also be responsible for their retreatment at a future date.

(b) Complex Heating Units

Units in this category utilize special equipment to achieve a drier residue as well as preventing the formation of residue "rocks" in the machinery. Equipment of this category is typically referred to as scraped surface evaporators which treat the wash liquid as a thin film falling down or flowing along the heated and scraped surface. In some instances, vacuum as well as heat is employed to distill the solvent. Machinery in this category reduces the solvent content but is not capable of reducing solvent content to the level of a few parts per million (in order to meet EPA standards) which is capable of being attained through the method and apparatus of the present invention. In addition, techniques must be utilized to prevent the resin from forming large lumps at any point in the machinery until the resin is discharged from the machine. Equipment of this category is also generally quite expensive.

(c) Steam Distillation for Solvent Recovery

Equipment of this category typically uses both indirect heat and "live" steam to effect evaporation. Maximum temperature is generally limited to 212° F. Many solvents are evaporated at a lower temperature because of the formation of an azeotrope. In this method, solvent is replaced with water (condensed steam). However, the resin present is not soluble in water, resulting in a sticky, gooey mess which is difficult to handle and can contaminate large areas of a processing plant. In addition, the residue may still contain material (i.e. solvents) which is above EPA limits for safe disposal in a landfill.

Another disadvantage of this technique is that there is no great reduction (if any) in volume since water replaces the evaporated solvents.

Still another disadvantage is that the evaporated material, after condensation, generally consists of two phases, namely a lower water phase and an upper solvent phase. The water phase can dissolve solvents. Many solvents have low water solubilities, such as, for example, toluene, and other solvents have quite high solubility, such as, for example, ethylene glycol. Regardless of whether the solubility is low or high, some solvent is present in the water and many publicly owned treatment works (POTWs) or sewage companies refuse to accept this water stream or alternatively charge high premiums for handling such contaminated water. Thus, the solid residue and the waste water are both highly hazardous or toxic rendering this technique impractical.

BRIEF DESCRIPTION OF THE INVENTION

The present invention overcomes all of the above disadvantages of existing separation techniques and yields reusable solvent and a solid residue which may be easily disposed of and meets all of the EPA standards for non-hazardous waste.

The method and apparatus of the present invention is comprised of utilizing an evaporating machine receiving the wash solvent and an extender comprised of a relatively inert solid material which is added to the wash solvent either at the beginning of the operation (i.e. evaporation) or at some time during the operation. The extender is a highly porous material which is in granulated or powdered form with the porosity being such that the residue is adsorbed into the interstices of the extender and not merely coated upon the superficial outer surface thereof whereby the extender adsorbs a large amount of residue relative to its particle size.

The vessel contents are heated to a high temperature sufficient to partially cure the resin (as well as evaporating the solvent) so that the particles will not stick together after processing and to completely remove the residual solvent in the residue in order to meet EPA requirements.

The contents of the vessel are continuously tumbled and mixed throughout the separation process to prevent the "balling" of solids or the creation of large lumps which can easily occur when the vessel contents are in the 40 percent to 75 percent solids range.

The temperature in the vessel at the discharge end of a continuous unit, or at the end of a batch unit, is typically in excess of 350° F. (176.67° C.) at atmospheric pressure. However, either higher temperatures or vacuum may be utilized when high boiling hydrocarbons, glycerine, esters or similar materials are encountered in the wash liquid, without any reduction in the efficiency of the novel method of the present invention.

Depending upon the application, the treatment of wash liquids may be performed as either a batch or continuous type operation. In a continuous operation, the mixer simultaneously tumbles the contents while continuously moving the contents from an inlet end to an outlet end at a rate which assures reaching the proper outlet temperature and separation of the solvent and residue and yields a residue which meets the EPA standards for non-hazardous waste, thus significantly reducing disposal costs. Upon completion of a batch evaporation, or at the outlet end of a continuous type machine, the contents of the vessel may be cooled by introduction of a coolant such as an inert gas to reduce the temperature at which the residue is discharged.

The technique for a batch operation requires approximately three—six hours residence time within the vessel and yields reusable solvent and a dry, easily manageable residue containing, at most, several parts per million of hazardous material, thereby meeting the EPA standards for non-hazardous waste.

OBJECTS OF THE INVENTION

It is, therefore, one object of the present invention to provide a novel method and apparatus for separating a solvent from a wash liquid and for adsorbing the residue in a flowable extender to facilitate the handling and disposal of the solid waste residue.

Still another object of the present invention is to separate a wash liquid comprised of a solvent and solid matter suspended therein comprising the steps of heating the wash liquid to evaporate the solvent, introducing an extender into the solvent for adsorbing the nonsolvent matter and continuously tumbling the vessel contents to prevent agglomeration of the solid matter and thereby yield reusable solvent and a dry flowable residue containing no greater than several parts per million of toxic or hazardous matter to facilitate disposal of the waste matter while avoiding contamination of the environment.

The above, as well as other objects of the present invention will become apparent when reading the accompanying description and drawings in which:

BRIEF DESCRIPTION OF THE DRAWINGS

FIGS. 3a–3c show schematic elevations of a precessing helix agitator. The helix rotates on its own axis and the axis rotates inside of a conical vessel. This blender with a suitable heating jacket may be used for practicing the novel method of the present invention.

DETAILED DESCRIPTION OF THE INVENTION AND PREFERRED EMBODIMENTS THEREOF

Figure 1A:
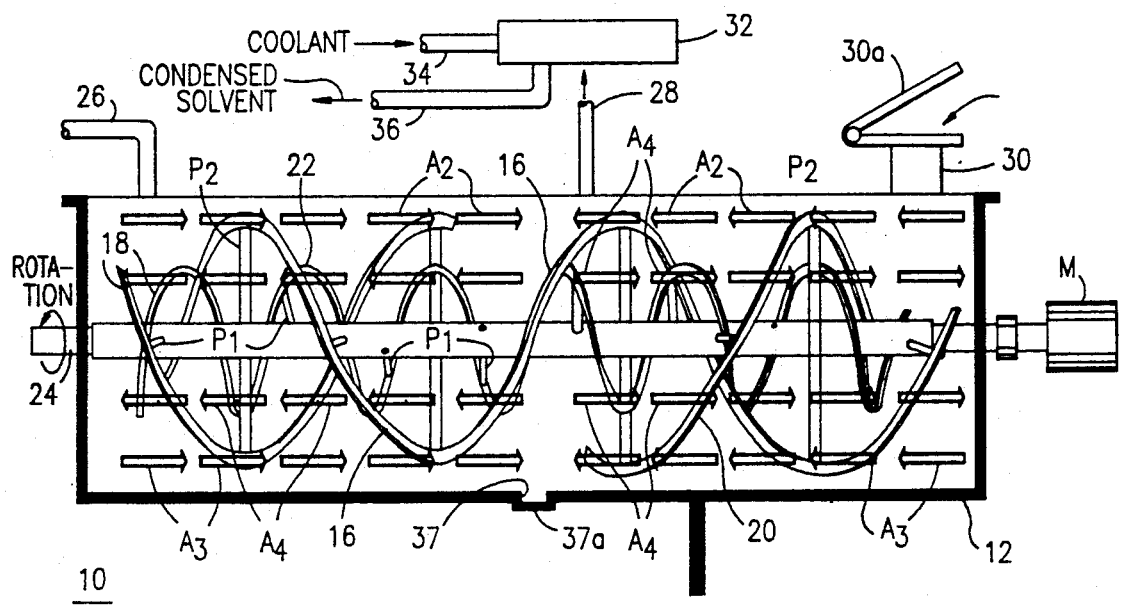
FIGS. 1a and 1b show schematic side and end elevations of an assembly of the ribbon blender type for practicing the novel method of the present invention.
Figure 1B:
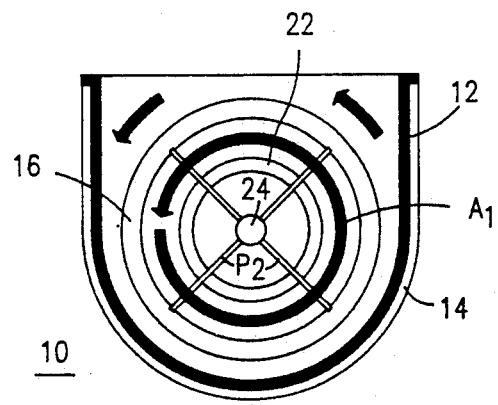

FIGS. 1a and 1b show a ribbon blender 10 which may be utilized to practice the method of the present invention. One suitable ribbon blender is the ribbon blender available from Day Mixing Company of Cincinnati, Ohio. The ribbon blender 10 comprises a jacketed vessel 12 with a heating jacket 14 for heating the contents thereof. The blender is comprised of a first elongated continuous helical ribbon 16, two short, helical ribbons 18 and 20 of a diameter substantially equal to the diameter of ribbon 16, and an elongated continuous helical ribbon 22 of a reduced diameter relative to ribbons 16, 18 and 20. The ribbons are supported upon a shaft 24 mounted within suitable bearings (not shown), enabling shaft 24 to freely rotate about its longitudinal axis. Projections P1 secured to shaft 24 at their inner radial ends support the smaller diameter ribbon 22 whereas projections P2 joined to shaft 24 support the larger diameter ribbons 16, 18 and 20. Shaft 24 is rotated by motor M. The rotation of the ribbons provide a triple mixing action as described in items 1 and 2 below:

1. The product is tumbled and carried radially around the inside of the tank as shown by arrow A1 in FIG. 1b.

2. The widths of the ribbons are carefully balanced to provide an even movement toward both ends and toward the center of the tank in order to prevent the load from building up in one spot. The axial movement toward the center is caused by the large diameter ribbons as shown by the arrows A2 and A3 whereas the linear movement along the longitudinal axis of shaft 24 and away from the center and toward the ends thereof is obtained by the smaller diameter ribbon, said movement being represented by the arrows A4.

The solvent-based wash liquid is placed in vessel 12 which is heated to a temperature sufficient to evaporate the solvent and to cure the resin so that the particles will not stick together substantially after processing, as well as assuring that the residue will contain an extremely small amount of residual solvent in order to meet EPA requirements. The wash liquid is introduced into vessel 12 by conduit 26.

The extender material is introduced into the vessel 12 through a charge port 30 having a hinged cover 30a capable of being bolted closed after a charge of extender material is inserted. The amount of extender introduced into the vessel is sufficient to adsorb and be coated by all of the resin pigment and other material contained within the solvent-based wash liquid. The extender may be removed from the blender from outlet opening 37 having a cover 37a which is normally bolted closed.

Solvent which evaporates due to the elevated temperature passes outwardly through conduit 28 for collection in a suitable condenser 32. A non-contact coolant is introduced into the condenser 32 by conduit 34 to reduce the temperature of the solvent to well below its boiling point. The condensed solvent is removed from the condenser by conduit 36.

The constant tumbling inside of blender 10 lifts, tumbles and mixes the ingredients and prevents the "balling" of solids or the creation of large lumps which would otherwise occur when the solids remaining within the blender constitute 50 to 75 percent of the total contents of the blender. The tumbling occurs at a slow speed of the order of 5 to 30 rpm depending on vessel size, i.e. is directly proportional to vessel size to maintain a similar velocity at the periphery of the radial tumbling ribbons. The drive motor M is sufficient to maintain tumbling even in the event of increasing viscosity and/or balling of the solid residue.

As was mentioned hereinabove, the extender is preferably added at the beginning of the treatment as the wash solvent is being initially heated or may be added during the treating process through a suitable lock chamber (not shown for purposes of simplicity). The extender adsorbs the resin, pigment and other materials and ultimately is dried in the heating process to provide a dry particulate relatively free flowing solid residue having an extremely low solvent content (of the order of less than 20 parts per million and even as low as being of the order of less than 5 parts per million).

A number of solid materials have been used as extenders and have yielded results which meet and even surpass EPA standards. Suitable extenders include (but are not limited to) the following list (nor are the concentrations set forth herein intended to be limiting). Typically, the concentration is the weight of solids added to a typical wash solvent as a percent of the weight of the wash solvent. Preferably the weight of the extender is from 7% to 20% of the weight of the residue in the solvent-based wash liquid.

| EXTENDER | CONCENTRATION |
|---|---|
| Microcel E by Johns Manville (Anhydrous Calcium Silicate) | 7½% |
| Powdered Glass (100 mesh*) | 25% |
| Saw Dust (Oak) (100 mesh*) | 17% |
| Saw Dust (Cedar) (100 mesh*) | 15% |
| Bentonite | 11% |
| Diatomaceous Earth | 8% |
| Charcoal (100 mesh*) | 12% |
| Ground Corn Cobs (100 mesh*) | 16% |

*(material sifted through 100 mesh screen).

The extender may be a material which is a powdered or fine particle solid with a high surface area (i.e. an irregular or highly textured surface) and which is not soluble in the solvents in the wash liquid. The irregular or high textured surface provides reception pockets or interstices which are capable of adsorbing pigment which far exceeds the adsorption capability of a particle having a smooth surface and occupying the same volume as the extender particles of the present invention.

Figure 2:
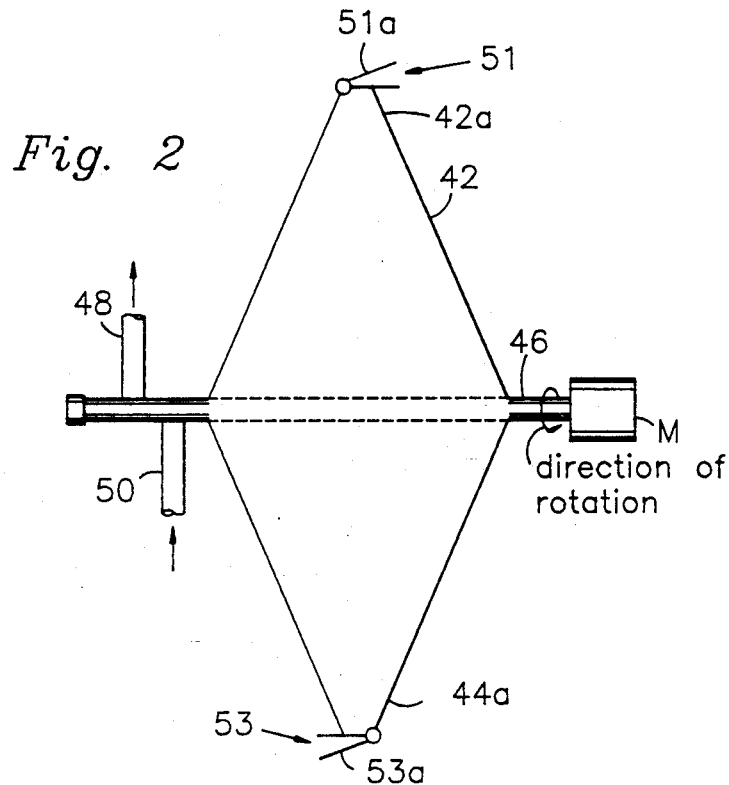
FIG. 2 shows a schematic elevation of a double cone blender for practicing the novel method of the present invention.

Although jacketed ribbon blenders of the type shown in FIGS. 1a and 1b may be used to successfully practice the present invention, it should be understood that other blenders may be used with equal success. For example, FIG. 2 shows a highly simplified schematic view of a double cone blender 40 comprised of first and second conical-shaped sections 42 and 44 which combine to create a single vessel with the large ends of the hollow conical sections 42 and 44 being joined in the manner shown in FIG. 2. Motor M rotates the double cone blender which is mounted for rotation about shaft 46 so that, as the apex 42a, for example, of cone 42 drops, the apex 44a of cone 44 rises. Shaft 46 is a special hollow shaft provided with rotary joints to permit vapor to be extricated at 48 and to permit heating fluids to be introduced at 50. One or two charge ports 51, 53 each having a hinged cover 51a, 53a (see FIG. 1a) which may be bolted closed is provided to introduce the extender material. One suitable double cone blender may be obtained from Charles Ross, Inc., Long Island, N.Y.

The double cone blender serves the same function as the multi-ribbon blender 10 shown in FIGS. 1a and 1b in that the constant tumbling prevents the extender material from becoming agglomerated as the solvent is evaporated and the resulting extender material, with the pigments and other matter suspended within the solvent-based wash liquid dries.

Still another suitable blender is the rotary precessing helix agitator blender 60 shown in FIGS. 3a–3c.

The helix agitator blender which may, for example, be a DAYMARK II Processor available from the Day Mixing Company of Cincinnati, Ohio, comprises a vessel 62 of substantially hollow conical shape with the narrow end facing downwardly and containing a screw agitator 64 mounted to rotate about a shaft 66 which is driven by motor 68. A common casting 70 houses motor 68 and a second motor 72 for rotating casting 70 and helix agitator 64 about a shaft 74 which is coincident with the longitudinal axis of conical vessel 62. The lower end of shaft 66 is journaled within a suitable bearing 76. The helix agitator 64, rotating about its longitudinal axis, produces a lifting action as it spirals the material in an upward flow, as shown best in FIG. 3a. Simultaneously therewith the screw orbits the tank as it revolves about the longitudinal axis thereof (see FIG. 3b) moving material away from the inner wall of the tank and deflecting it into the center region of the tank, setting up a second wider spiral current throughout the batch as shown best by arrows B in FIG. 3b.

Material lifted by the screw gravitates downwardly, thoroughly intermixing with the material being spiraled upward, resulting in a highly intimate intermingling and intermixing of all ingredients (see arrows C in FIG. 3c). The vessel is provided with a heat jacket (not shown for purposes of simplicity) similar to the heat jacket provided in the ribbon blender shown in FIG. 1b. The solvent-based wash liquid and extender may be added by way of conduits 78 and 80, respectively. Evaporated solvent is drawn off through conduit 82. The dried, solid contents of the tank may be withdrawn through lower opening 84 having a bolted cover 84a.

Figure 4:
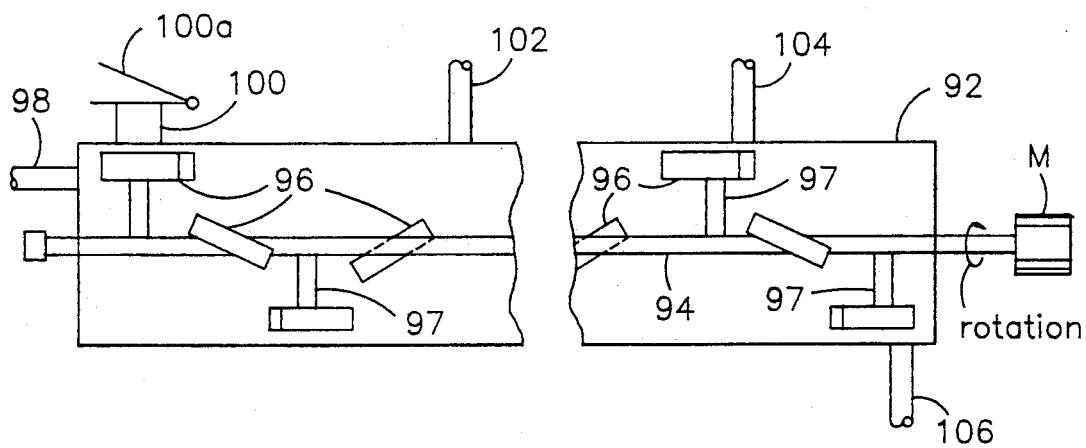
FIG. 4 shows a schematic elevation of a processing assembly practicing the novel method of the present invention for continuously processing wash liquid using pitched paddle arms.

FIG. 4 shows still another preferred embodiment of the present invention in which apparatus 90 is employed for continuous treatment as opposed to batch treatment of solvent-based wash liquids.

As shown in FIG. 4, a vessel 92 provided with a heating jacket (not shown for purposes of simplicity) surrounding vessel 92 includes a shaft 94 driven by motor M for rotating paddle blades 96. The paddle blades 96 are mounted at 90° angles upon shaft 94 by rods 97 and are each oriented at an angle to the longitudinal axis which angle is selected to tumble the contents of vessel 92 and simultaneously to slowly, but continuously drive the heated, tumbling contents from the inlet (left-hand) end of vessel 92 toward the outlet (right-hand) end thereof. Solvent-based wash liquid is introduced into vessel 92 by way of conduit 98 and extender particulate is introduced into vessel 92 by way of charge port 100 with a hinged cover 100a which may be bolted closed. One or more conduits 102, 104 draw off the evaporating solvent. Conduits 102, 104 may be coupled to a common outlet conduit for delivering the evaporated solvent to a condenser (not shown for purposes of simplicity). The dried extender particulate which has adsorbed all of the resin and other matter in the wash liquid is removed through outlet 106. The blender assembly 90 is of a length sufficient to evaporate substantially all of the solvent and to be assured that the extender particulate has dried sufficiently as it reaches the right-hand end thereof to be removed at the outlet end of the vessel. The tank has been shown partially broken away to indicate that the length may vary according to the particular wash solvent being treated and further according to the extender being utilized.

Another blender suitable for operating according to the technique of the present invention on a continuous basis is the Continuous Processor available from Teledyne Readco, York, Pa.

Other types of blenders may be utilized such as the ribbon blenders and the mixers manufactured by Teledyne Readco of York, Pa.

The blenders may utilize a condensing system for handling evaporating solvent, said condensing system being comprised of a standard shell and tube exchanger of customary design, a detailed description being omitted herein for purposes of simplicity. For example, a suitable condensing system of the type described herein and referred to as Model BEM Single Pass Condenser may be obtained from Manning & Lewis, Union, N.J.

In case very high boiling solvents are encountered, then operation under vacuum may be necessary. This detail is conventional and is not described for purposes of brevity.

The type of heating which may be utilized with the apparatus employed to practice the present invention may be any of the usual type of heating sources including, electrical resistance, electrical induction, steam at 150 psig or higher pressure, hot oil (such as Monsanto Therminol or other similar oils), and Dowtherm G vapors.

Some examples of the novel method for treating wash liquids will now be given.

EXAMPLE-PAINT

Three drums of wash solvent were accumulated from the washing of paint filling the machine during a one day operation. Samples were taken from each drum, mixed and analyzed, and were found to contain the following:

| |
|---|
| 89.6% solvent |
| 2.9% pigment |
| 7.5% resin or other solid |
| 100.0% |

The total weight of the contents of the drums was 1148 pounds. These contents were pumped and poured into a ribbon blender of the type shown in FIGS. 1a and 1b and having a six drum capacity. 86 pounds of Johns-Manville Microcel E anhydrous calcium silicate was added to the 1148 pounds of wash liquid. The ribbon agitators were started and the contents were slowly heated by means of hot oil within the vessel heating jacket to an internal temperature of 345° F. Heating was then stopped and cool nitrogen was blown into the vessel at about 5 cfm. The contents of the vessel quickly cooled and were discharged into a drum at a temperature in the range of from 250° F. to 200° F. 1016 pounds of solvent were condensed by a condenser. 119 pounds of residue was collected which filled approximately ¼ of a drum.

The residue was submerged in water for one week. Less than 0.5 ppm (parts per million) of organics was found in the water. Some residue or losses were visible in the ribbon blender. Because of the warm water in the condenser, some solvent evaporated.

The results far exceeded safe EPA limits.

Various tests showed that during the evaporation the resin and the extender go through a sticky phase. However, the higher the extender concentration, the smaller the handling problem of the final residue.

Conventional production units typically have sufficient horsepower to overcome the tendency of the extender particles to agglomerate. The constant tumbling of the material avoids such agglomeration. In the absence of the extender, this would not be possible at all.

The concentration of the extender particulate can be reduced when employing extenders having large surface areas and/or porous surfaces.

A latitude of modification, change and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein described.

What is claimed is:

1. A method for recovery of solvent from a solvent-based wash liquid containing paint residue removed from paint making equipment by use of a solvent and for reducing the residue to a non-hazardous waste material, comprising the steps of:

placing the solvent-based wash liquid in a vessel;

heating said vessel to a temperature sufficient to cause the solvent to boil and evaporate;

drawing off the evaporated solvent from said vessel, and condensing the evaporated solvent;

introducing an extender into the vessel in an amount sufficient to adsorb the residue, said extender being a substantially inert material ground into a granulated consistency, said extender being introduced as a percent of the weight of the residue remaining in said vessel; said percent lying in the range of from 7-20% of the weight of said residue;

continuously tumbling the contents of the vessel by rotating the contents of the vessel in the range of from 5-30 rpm to prevent solid matter from agglomerating; and drying the contents of the vessel to provide a particulate, free-flowing solid residue having a solvent content of the order of less than ten parts per million.

2. The method of claim 1 wherein the extender is a porous material having the fineness of the order of at least 100 mesh.

3. The method of claim 1 wherein the extender employed is taken from the group consisting of powdered calcium silicate, powdered glass, sawdust, bentonite, charcoal, diatomaceous earth, and ground corn cobs.

4. The method of claim 3 wherein the extender employed has the ability of being sifted through a 100 mesh screen.

5. The method of claim 1 wherein the step of heating comprises the step of raising the vessel contents to a temperature of the order of at least 350 degrees Fahrenheit at atmospheric pressure depending on the solvents present or of operating under a vacuum.

6. The method of claim 1 wherein the step of heating comprises the step of raising the vessel contents to a temperature sufficient to boil the solvent at atmospheric pressure.

7. The method of claim 6 wherein the temperature is at least 350° F.

8. The method of claim 1 wherein the step of heating the contents of the vessel comprises the step of:

further raising the contents to a level of greater than 375° F. to treat high boiling hydrocarbons, glycerine and esters.

9. The method of claim 8 further comprising the step of heating the contents in the presence of a vacuum.

10. The method of claim 1 further comprising the steps of:

removing heat from the vessel after a predetermined time interval; and introducing a coolant into the vessel for cooling the contents of the vessel.

11. The method of claim 10 wherein said coolant is introduced into the vessel at a flow rate of the order of 5 cfm.

12. The method of claim 11 wherein the coolant introduced is nitrogen.

13. The method of claim 1 wherein said vessel is provided with an inlet and an outlet end, said method further comprising the steps of:

introducing the residue containing solvent and extender into the inlet end of the vessel;

continuously moving the contents of the vessel from the inlet end toward the outlet end as the contents are being tumbled;

removing the solid matter from said vessel at said outlet end, the movement of the solid matter from the inlet to the outlet end being sufficient to evaporate substantially all of the solvent and reduce the solvent in the solid matter withdrawn from the outlet end to less than 20 ppm.

14. The method of claim 1 wherein said extender is introduced into the solvent preparatory to heating the contents of the vessel.

15. The method of claim 1 wherein the step of introducing the extender is comprised of introducing the extender as the vessel contents are being heated.

16. The method of claim 1 wherein the heating step further comprises heating said contents so that the temperature at an outlet end is sufficient to assure removal of solvent from the extender extracted from the outlet end.

* * * * *